United States Patent [19]
Li et al.

[11] Patent Number: 5,595,661
[45] Date of Patent: Jan. 21, 1997

[54] PROCESS FOR RECOVER HALOCARBONS FROM LIQUID WASTE SLURRIES

[75] Inventors: Michael Hsin-Chwen Li, Neshanic Sation; Hari K. Tikku, Edison; Marc Steinman, Livingston, all of N.J.

[73] Assignee: Schering Corporation, Kenilworth, N.J.

[21] Appl. No.: 285,254

[22] Filed: Aug. 3, 1994

[51] Int. Cl.$^6$ .................................................. B01D 11/04
[52] U.S. Cl. ........................................ 210/634; 210/319
[58] Field of Search ................................. 210/259, 634, 210/638, 266, 511, 319

[56] References Cited

U.S. PATENT DOCUMENTS

| | | |
|---|---|---|
| 679,575 | 7/1901 | Reese . |
| 1,770,736 | 7/1930 | Funic . |
| 2,000,606 | 5/1935 | Othmer .............................. 210/511 X |
| 4,645,512 | 2/1987 | Johns . |
| 5,009,787 | 4/1991 | Broussard, Sr. . |
| 5,271,842 | 12/1993 | Degen et al. . |

FOREIGN PATENT DOCUMENTS

| | | |
|---|---|---|
| 54-148707 | 11/1979 | Japan . |
| 56-24499 | 3/1981 | Japan . |
| 791025 | 2/1958 | United Kingdom . |

OTHER PUBLICATIONS

CA115(16):165322n; vol. 115, 1991.
CA115(10):94913t; vol. 115, 1991.
CA114(6):45610n; vol. 114, 1991.
CA112(4):22753f; vol. 112, 1990.
CA79(6):32971q; vol. 79, 1973.
CA93(26): 24157v; vol. 93, 1980.
CA95(10):82805q; vol. 95, 1981.
CA67(1);2750b; vol. 67, 1967.
CA73(2):5245a; vol. 73, 1970.
CA110(24):215465f; vol. 110, 1989.
CA109(26):233271y; vol. 109, 1938.
UOP Molecular Sieves, a reprint/brochure of Union Carbide's Molecular Sieves, F–1979J, 2M, Jan. 1990, pp. 1–20.
A. E. Kar, W. Gebert and M. Wang, Extraction of Whole Fermentation Broth with Karr Reciprocating Plate Extraction Column, The Canadian Journal of Chemical Engineering, vol. 58, Apr. 1980, pp. 249–252.
A. Karr and R. Crusak, A Fresh Look at Liquid–Liquid Extraction, Chemical Engineering, Apr. 1991, pp. 112–114, 116, 118 and 120.
A. E. Karr, Amplification of the Scale–up Procedure for the Reciprocating Plate Extraction Column, AIChE Journal, vol. 31, No. 4, Apr. 1985, pp. 690–692.
Chemical Abstract: vol. 109: 75847j (1988) apparatus for purification of Fron–group solvents.
Data Sheet PF670, Fluorogard AT All–Teflon Cartridge Filters, Millipore Corporation, Bedford, Massachusetts, (1993), pp. 1–4.
Oral Presentation by Jeff Barrett titled "Freon Recovery", given at Liberty Science Center, Jersey City, New Jersey on Aug. 27, 1993, based upon 4 page report.
Sean C. McRae, Mentor Guide for a High School Student Researcher, Liberty Science Center, Partners in Science, 1993, Summer Research Program, including a Calendar of Events from May 29–Aug. 27, 1993, 9 pages.

*Primary Examiner*—Frank Spear
*Attorney, Agent, or Firm*—Joseph T. Majka

[57] ABSTRACT

A process for recovering a halocarbon from a liquid waste slurry containing the halocarbon admixed with one or more contaminants using countercurrent or co-current extraction is described.

17 Claims, 2 Drawing Sheets

PROCESS FOR RECOVER HALOCARBONS FROM LIQUID WASTE SLURRIES

FIELD OF THE INVENTION

The present invention relates to a process for recovering halocarbons from liquid waste slurries, particularly freon-type waste slurries.

BACKGROUND

Halocarbons are compounds containing halogen atoms, i.e. chloro, fluoro or bromo, and are useful for numerous applications, for example, in pharmaceuticals, i.e. aerosols to treat respiratory diseases such as asthma and emphysema, for refrigerants, i.e. air-conditioning, for food preparation, for sterilization procedures, for the plastics industry and for cleaning, i.e. as solvents for dry cleaning clothes and electronic components. Over time, such halocarbons form waste slurries through contamination with other solvents, solids and/or water. The disposal of such waste slurries has become expensive and more difficult under increasingly stringent govenmental regulations. Accordingly, an approach was sought for recovering halocarbons from waste slurries using a process that would minimize waste generation, have low energy requirements, and be efficient and economical.

SUMMARY OF THE INVENTION

In one embodiment, the present invention is directed toward a process for recovering a halocarbon from a liquid waste slurry containing the halocarbon admixed with one or more contaminants, comprising the steps of:

a) optionally, separating out insoluble or suspended solids from the waste slurry;

b) allowing a flow of liquid waste slurry to move either countercurrently or co-currently to a flow of a liquid which is immiscible with the halocarbon in the waste slurry through one or more agitators that promote dispersion of the liquid waste slurry and the immiscible liquid at each agitator, thus facilitating transfer of contaminants from the waste slurry to the immiscible liquid;

c) allowing the halocarbon to separate from the immiscible liquid and the contaminants; and d) recovering the halocarbon or raffinate.

In an optional and preferred embodiment, the process comprises the additional purification step:

e) passing said halocarbon or raffinate through a molecular sieve to remove residual immiscible liquid and/or contaminants.

Preferably, the insoluble or suspended solids are separated from the waste slurry by filtration and/or centrifugation. Also preferred is that the immiscible liquid is water. Also preferred is that the halocarbon component in the waste slurry is a freon-type liquid, such as trichlorofluoromethane, also known as freon 11.

In another embodiment, the present invention is directed towards a process for recovering a halocarbon from a liquid waste slurry containing the halocarbon admixed with one or more contaminants, comprising, providing a countercurrent extraction column having one or more agitators and means for moving said agitators, said column also having in the following vertical order from the column top to the column bottom: an immiscible liquid outlet, a waste slurry inlet, an immiscible liquid inlet and a raffinate outlet;

introducing or feeding optionally filtered or unfiltered liquid slurry into said waste slurry inlet;

introducing or feeding a liquid which is immiscible with the halocarbon component of the waste slurry into the immiscible liquid inlet;

allowing the flow of liquid waste slurry to move countercurrently to the flow of the immiscible liquid through said one or more agitators that promote dispersion of the liquid waste slurry and the immiscible liquid at each agitator, thus facilitating transfer of contaminants from the waste slurry to the immiscible liquid;

removing the immiscible liquid containing waste contaminants extracted from said optionally filtered or unfiltered liquid slurry, at said immiscible liquid outlet;

allowing the halocarbon to separate from the immiscible liquid and the contaminants; and recovering the halocarbon or raffinate at said raffinate outlet.

One advantage of the present invention is that it provides a process for removing contaminants from halocarbon waste slurries in order to provide substantially purified (i.e. substantially water and solvent free) halocarbons.

A second advantage of the present process is that it enables halocarbons to be recycled in an environmentally safer manner than by land disposal or incineration. For example, the present process complies with the decision of the Montreal Protocol on Substances That Deplete the Ozone Layer. In addition, the present process is believed to comply with the pollution reduction programs of state and Federal agencies for Environmental Protection.

A third advantage of the present process is that it reduces halocarbon emission to the atmosphere, thus reducing ozone layer depletion and/or greenhouse effect on the Earth.

A fourth advantage of the present process is that it eliminates the costs associated with disposal of contaminated halocarbons.

A fifth advantage of the present process is that by taking advantage of gravity, together with the densities and solubilities of the halocarbons and extracting immiscible liquids, the present process can significantly reduce energy consumption compared with conventional processes which utilize energy intensive distillation, condensation and/or cryogenic apparatus.

A sixth advantage of the present process is that its optional use of molecular sieves enables removal of trace contaminants such as water and small organic molecules which otherwise are extremely difficult to remove.

A seventh advantage of the present process is that in its preferred embodiment where water is used as the immiscible liquid, the use of water enables the process to be carried out more safely, rapidly and economically compared with conventional procedures using flammable organic solvents.

An eighth advantage of the present process is that its flexibility for continuous processing enables it to process continuously, multiple sized batches of contaminated halocarbons, instead of having to stockpile a fixed quantity of material before the removal of contaminants can begin.

A ninth advantage of the present process is that it can allow users presently using halocarbon solvents in their processes to continue doing so in compliance with applicable governmental regulations, since the present invention allows an easy, efficient and rapid process for recycling halocarbons. This is particularly advantageous for those applications where there are no satisfactory alternatives to halocarbon solvents.

A tenth advantage of the present process is that it can be conducted in a space significantly smaller than that required for comparable operations employing distillation, condensation and/or cryogenic apparatus.

IN THE FIGURES

Figure 1:
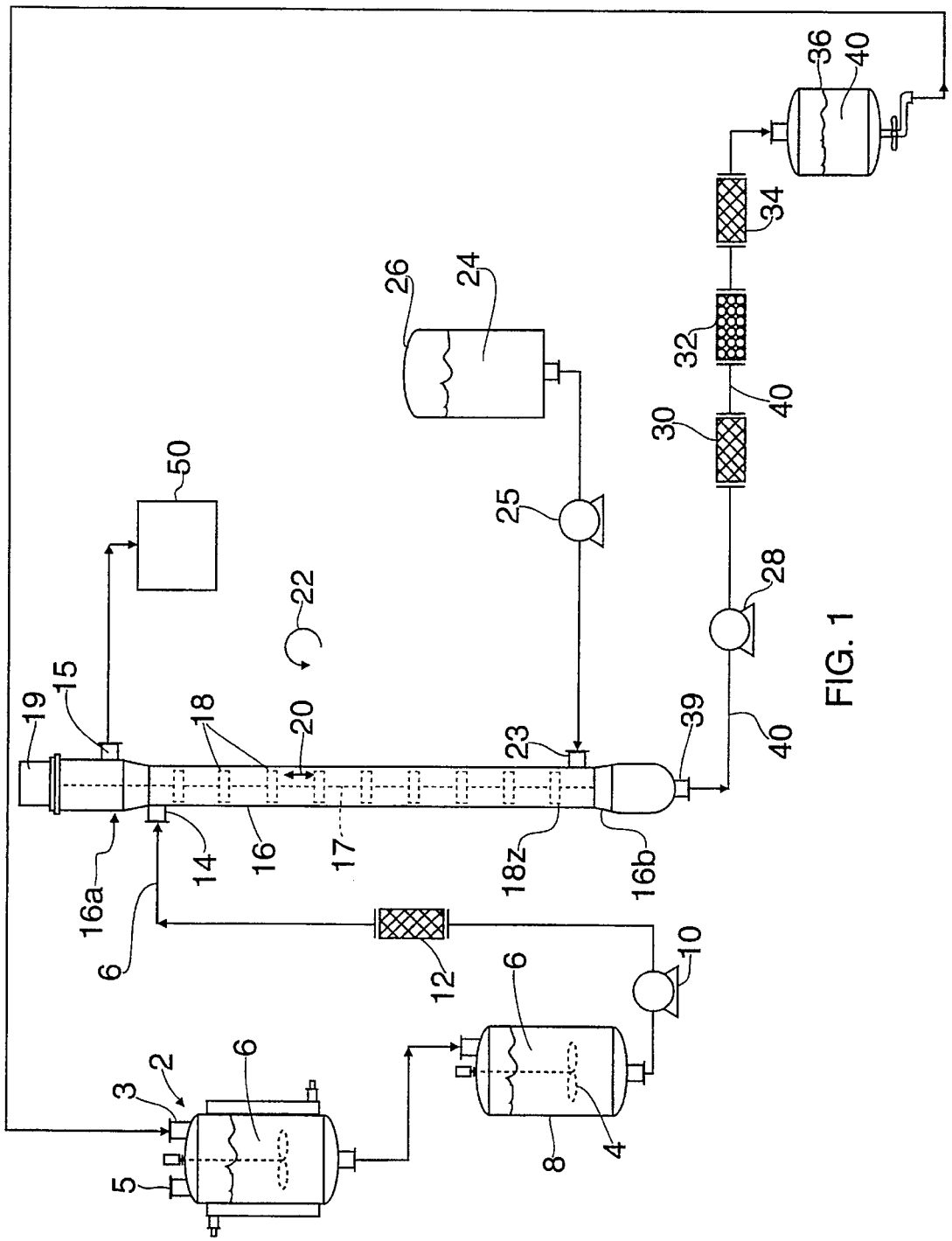
FIG. 1 shows a countercurrent extraction system.

FIG. 1 depicts a system using countercurrent extraction, for recovering substantially purified halocarbon from a liquid waste slurry containing a halocarbon admixed with one or more contaminants. Halocarbon waste slurry 6 containing solid waste material is obtained from reactor or generator 2 equipped with a stirrer. Waste slurry 6 is fed into a holding tank 8 equipped with agitator 4 for maintaining the solid waste material in suspension. Pump 10 pumps halocarbon waste slurry 6 from holding tank 8 into countercurrent extraction column 16 through optional filter 12 to remove or filter out insoluble or suspended solids from the waste slurry prior to introducing the waste slurry into column 16. Optionally filtered or unfiltered waste slurry 6 is introduced into waste slurry inlet 14 proximate or near the column top 16a of countercurrent extraction column 16. Column 16 is equipped with a shaft 17, onto which are mounted one or more agitators 18, which preferably operate in a reciprocating vertical mode within the interior of column 16, as indicated by the up and down direction of arrow 20. Optionally, agitators 18 can operate in rotating mode within the interior of column 16, as indicated by the circular directional arrow 22. Optionally, sonication can be used either alone or in combination with either of the above types of agitators. The movement or motion of agitators 18 can be effected using electrical or pneumatic means, i.e. by motor 19. Non-moving or fixed agitators, e.g. baffles, can be attached to the interior of column 16 to aid dispersion. Liquid 24, such as water, which is immiscible with the halocarbon component in waste slurry 6, is pumped from holding tank 26 using pump 25 into immiscible liquid inlet port 23 located proximate to column bottom 16b of column 16. After waste slurry 6 and immiscible liquid 24 are introduced or fed into column 16, the reciprocating or rotating motion of agitators 18 promotes dispersion of optionally filtered or unfiltered waste slurry 6 and immiscible liquid at each agitator within column 16, thus facilitating transfer of contaminants from waste slurry 6 to immiscible liquid 24. Following each agitation or dispersion, immiscible liquid 24 becomes increasingly soiled with waste contaminants as it continues to move or flow countercurrently to the movement or flow of waste slurry 6. The lighter, immiscible liquid 24 containing waste contaminants extracted from optionally filtered or unfiltered liquid slurry 6, continues to flow upward toward column top 16a, where it is removed from column 16 at or through immiscible liquid outlet 15, and consolidated into container 50 for disposal. Conversely, the heavier or denser halocarbon component from waste slurry 6 tends to becomes increasingly more purified or cleansed as it flows downward toward bottom end 16b. After the last halocarbon dispersion either with the last moving agitator 18z or a non-moving agitator (not shown), substantially purified halocarbon is allowed to separate in the column from the immiscible liquid and contaminants proximate to column bottom 16b, where the substantially purified halocarbon or raffinate 40 is recovered or removed at raffinate outlet 39. After removal from the column, raffinate 40 can be further purified by passing it through optional filters 30 and 34 and/or through optional molecular sieve 32. For example, in FIG. 1, raffinate 40 is pumped by pump 28 through filter 30 to remove residual solids. Raffinate 40 is then passed through molecular sieve 32 to remove residual immiscible liquid and/or residual contaminants (i.e. organics). Raffinate 40 can also be passed through filter 34 to remove any particulates picked up from molecular sieve 32. Raffinate 40 (i.e. the substantially purified halocarbon) of the desired purity can be stored in holding tank 36 and reused for the desired application by recycling it into reactor 2 through reactor inlet port 3 or 5.

Figure 2:
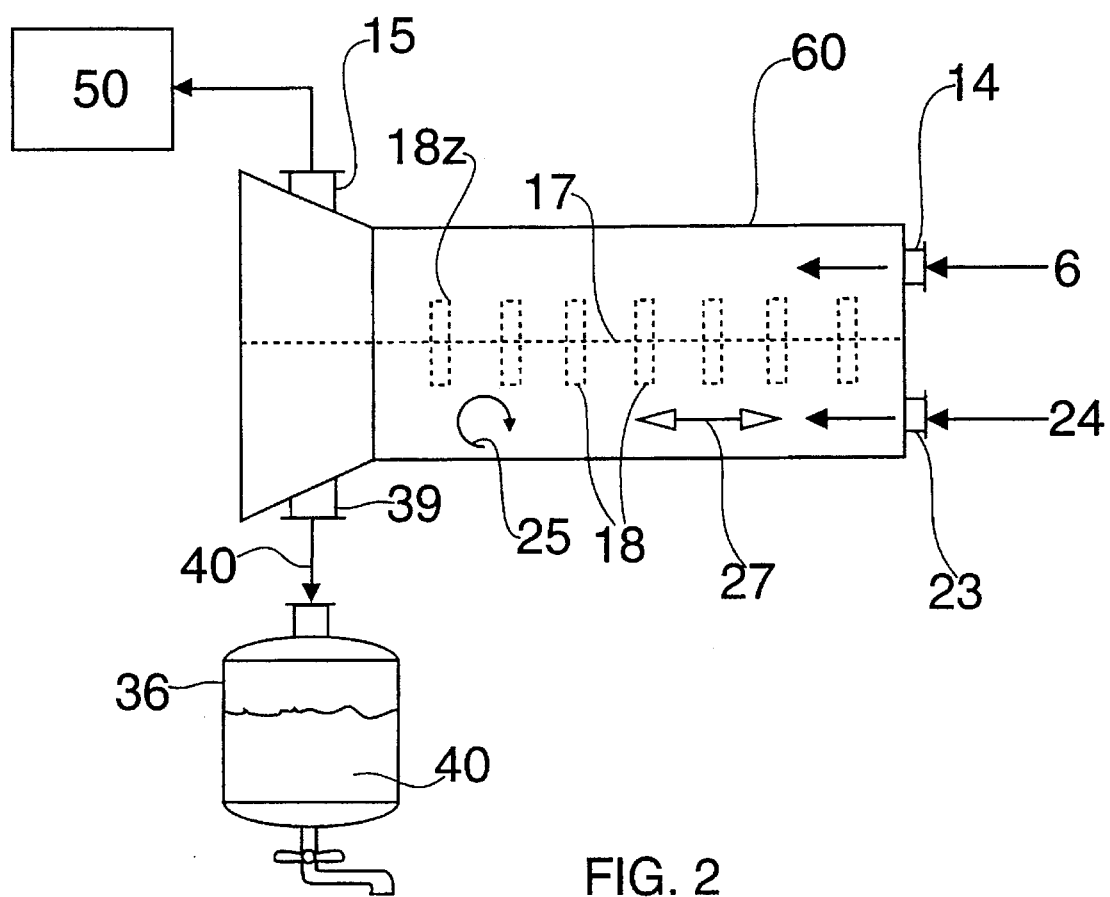
FIG. 2 shows a co-current extraction system.

FIG. 2 depicts a simplified system using co-current extraction, for recovering substantially purified halocarbon from a liquid waste slurry containing a halocarbon admixed with one or more contaminants. Optionally filtered or unfiltered waste slurry 6 is introduced into waste slurry inlet 14 located proximate to the top of co-current extraction column 60. Column 60 is shown to be positioned horizontally. Horizontal column 60 is equipped with a shaft 17, onto which are mounted one or more agitators 18, which preferably operate in a reciprocating horizontal mode within the interior of column 60, as indicated by the left to right direction of arrow 27. Optionally, agitators 18 can operate in rotating mode within the interior of column 16, as indicated by the circular directional arrow 25. Optionally, sonication can be used either alone or in combination with either of the above types of agitators. The movement or motion of agitators 18 can be effected using electrical or pneumatic means as described before. Non-moving agitators, e.g. baffles, can be attached to the interior of column 60 to promote or aid dispersion. Liquid 24, such as water, which is immiscible with the halocarbon component in waste slurry 6, is pumped into immiscible liquid inlet port 23 located proximate to the bottom of column 60. After waste slurry 6 and immiscible liquid 24 are introduced or fed into column 60, the reciprocating or rotating motion of agitators 18 promote dispersion of optionally filtered or unfiltered waste slurry 6 and immiscible liquid at each agitator within horizontal column 60, thus facilitating transfer of contaminants from waste slurry 6 to immiscible liquid 24. Following each agitation or dispersion, immiscible liquid 24 becomes increasingly soiled with waste contaminants as it continues to move or flow co-currently to the movement or flow of waste slurry 6. The lighter, immiscible liquid 24 containing waste contaminants extracted from optionally filtered or unfiltered liquid slurry 6, continues to flow upward toward the top of column 60, where it is removed at immiscible liquid outlet 15, and consolidated into container 50 for disposal. Conversely, the heavier or denser halocarbon component from waste slurry 6 tends to becomes increasingly more purified or cleansed as it flows downward toward the bottom of column 60. After the last halocarbon dispersion either with the last moving agitator 18z or a non-moving or fixed agitator (not shown), substantially purified halocarbon is allowed to separate in the column from the immiscible liquid and contaminants proximate to the bottom of the column, where the substantially purified halocarbon or raffinate 40 is recovered or removed at raffinate outlet 39 and stored in holding tank 36.

DETAILED DESCRIPTION OF THE EMBODIMENTS

The term, "halocarbon" refers to halogenated hydrocarbons, halogenated alkanes of one to four carbon atoms or halogenated alkenes of two to four carbon atoms in which one or more of the hydrogen atoms are substituted with one or more halogen atoms, such as chloro, fluoro or bromo.

The term "countercurrent" means that during the process for recovering halocarbon from a liquid waste slurry, that the flow of waste slurry moves counter to or against the flow of the immiscible liquid.

The term "co-current" means that during the process for recovering halocarbon from a liquid waste slurry, that the flow of waste slurry moves in the same general direction as the flow of the immiscible liquid.

The term "immiscible liquid" refers to a liquid which will form two phases when mixed in some ratio with the halocarbon component in the waste slurry. Suitable liquids which are immiscible with the halocarbon include water, acetone, and C1–C6 alcohols or mixtures thereof. Representative C1–C6 alcohols include methanol, ethanol, propanol, isopropanol, n-butanol, t-butanol, pentanol, n-hexanol, cyclohexanol and the like. The immiscible liquid should be sufficiently clean or purified to remove, extract or effect transfer of contaminants from the waste slurry in order to provide a raffinate or halocarbon of the desired purity. Where water is employed as the immiscible liquid, distilled and/or deionized water is preferred, although tap water suitable for industrial purposes also can be employed.

The term "dispersion" refers to the act or process of dispersing or of intimately mixing the waste slurry and the immiscible liquid using one or more agitators.

The term "substantially purified" means that the halocarbon being recovered (i.e. raffinate) after countercurrent or co-current extraction is purer than the halocarbon in the waste slurry it is derived from. At the same time, the level or amount of contaminants (i.e. salts, organic and/or inorganic solvents) in the purified raffinate is lower than the level or amount of contaminants in the waste slurry.

Prior to introducing or feeding unfiltered slurry into the waste slurry inlet, insoluble or suspended solids (i.e. particulate contaminants) optionally, can be separated from the slurry by filtering and/or centrifugation. The type and size of the solids will depend upon the previous application and/or environment that the halocarbon was used. Filtering means should be used which can remove the smallest or as close to the smallest sized particles in the waste slurry as possible. Such filtering means should be able to remove solids or particles ranging down to 0.05 microns(um) or micrometers. One commercially available filter is Floroguard® (trademark of Millipore Corporation, Massachusetts) AT All-Teflon® (trademark of E.I. dupont de Nemours & Co., Delaware) Cartridge Filters are made of integral hydrophobic polytetrafluoroethylene (PTFE) membrane in a pleated configuration, perfluoroalkoxy resin (PFA) pleated supports, PFA core, sleeve and endcaps, and are available in the following pore sizes to provide particle retentions of 0.05 um, 0.1 um, 0.2 um, 0.5 um and 1 um. Another filter is Fluorodyne® (trademark of Pall Process Filtration Company, New York) Filters (E Grade) made of two layers of hydrophilic polyvinylidene fluoride (PVDF) membrane having pore sizes to provide particle retention of 0.1 um and 0.2 um. Filtering can be carried out in successive steps using filters of decreasing sizes. For example, two or more stages of filtration can be used to filter out particulate contaminants from the slurry prior to addition of the filtered slurry to either the countercurrent or co-current extraction column. If the waste slurry contains little or no solids (e.g., the only contaminant is water), the filtering step may be unnecessary and thus eliminated. Centrifugation can be employed when the slurry contains more than about 5% solids (weight/volume).

Countercurrent type extraction columns are known, as taught in R. W. Cusack, P. Fremeaux and D. Glatz, A Fresh Look at Liquid-Liquid Extraction, Chemical Engineering, April 1991, pp. 112–120 and A. E. Karr, W. Gebert and M. Wang, Extraction of Whole Fermentation Broth with Karr Reciprocating Plate Extraction Column, The Canadian Journal of Chemical Engineering, 58: 1980, pp. 249–252. Generally, vertically positioned columns are preferred for countercurrent extraction, and horizontally positioned columns are preferred for co-current extraction. The column, agitators therein, inlets, outlet and connections thereto can be made of any suitable material compatible with the waste slurry and the immiscible liquid, such as copper, stainless steel (i.e. stainless steel 316), glass, bronze, carbon steel, plastics and the like or combinations thereof such as glass-lined stainless steel. Suitable plastics include polyethylene, polypropylene, nylons, or polytetrafluoroethylene polymers such as Teflon® trademark of the DuPont Company of Wilmington, Del. The length and diameter of the column can vary considerably, depending upon the nature of the immiscible liquid and the waste slurry, the level of impurities in the waste slurry, the volume of the waste slurry to be processed, the number of agitators desired in the countercurrent or co-current extraction column, and the speed of the feed rates into the column. For example, the length of the column can range from about 1.5 meters (5 feet) to about 90 m (300 feet), preferably from about 1.5 m to about 23 m (5 to about 75 feet). The diameter of the column can range from about 0.08 m (0.25 feet) to about 1.5 m (5 feet), preferably from about 0.22 m to about 0.46 m (0.75 to 1.5 feet).

Dispersion or mixing of the optionally filtered or unfiltered liquid slurry and the immiscible liquid can be promoted by employing moveable mechanical agitators such as mesh, disks, baffles, or plates (perforated or non-perforated) capable of reciprocating vertical or horizontal motion within the column. Vertical or horizontal motion promotes vertical or horizontal mixing, respectively, of both the liquid waste slurry and the immiscible liquid. Vertical mixing means that the liquid waste slurry and the immiscible liquid are being mixed in a vertical direction, i.e. in an up-and-down motion. Horizontal mixing means that the liquid waste slurry and the immiscible liquid are mixed in a horizontal direction, i.e. in a vortex-like motion. Agitators for either vertical or horizontal mixing can be obtained commercially from, for example, the Otto H. York Company of Parsippany, N.J., U.S.A. Alternatively, the dispersion of the liquid waste slurry and the immiscible liquid can be achieved by sonicating both liquids with sonicating devices, either alone or in combination with the agitators, described before. The number of agitators can vary from about one or two to about 50, preferably from about 6 to about 36, depending upon the desired extent of purity of the halocarbon. The greater number of agitators tends to promote more dispersions, thus facilitating improved transfer of contaminants from the waste slurry to the immiscible liquid.

The waste slurry and/or the immiscible liquid should be maintained at a temperature which allows for effective transfer of contaminants from the waste slurry to the immiscible liquid. Such temperatures can range from just above freezing to below the boiling point of the halocarbon component in the waste slurry, such as from about 0° C. to 30° C. (32° F.–90° F.), preferably from about 14° C. to 18° C. (58° F.–65° F.) for Freon 11.

The relative amounts of immiscible liquid to waste slurry that can be introduced into the column can vary considerably, depending upon the desired extent of purity for the raffinate. Such amounts can range from 0.1 to about 100 volumes or more of immiscible liquid for each volume of waste slurry, preferably from about 0.1 to 10 volumes of immiscible liquid for each volume of waste slurry, more preferably about 0.5 to about one volume of immiscible liquid for each volume of waste slurry. The ratio of the immiscible liquid to the waste slurry can be controlled using an interface controller.

Other parameters can be modified to optimize performance of the present process such as the flow rate into the waste slurry inlet, the flow rate into the immiscible liquid inlet, and the speed of mixing by the agitators. Such parameters can vary considerably, depending upon the dimensions of the column, the number of agitators, the nature of the immiscible liquid and the waste slurry, and the desired extent of purity for the raffinate.

Optionally, after removal from the column, the halocarbon or raffinate can be further purified by passing it through a molecular sieve to remove residual water and/or other residual contaminants. Molecular sieves are synthetically produced crystalline metal alumino-silicates that have been activated for adsorption by removing their water of hydration. Because little or no change in structure occurs during dehydration of the sieve, unusually highly porous adsorbents are formed that have affinities for water and certain other gases and liquids. Molecular sieves belong to a class of compounds known as zealites. Molecular sieves are crystalline zeolites having a basic formula of $M_{2/n}O\cdot Al_2O_3\cdot xSiO_2\cdot yH_2O$ where M is a cation of n valence. Preferably, the molecular sieve is of the Type 4A and Type 13X which have the following unit cell formulas:

Type 4A: $Na_{12}[(AlO_2)_{12}(SiO_2)_{12}]\cdot 27H_2O$

Type 13X: $Na_{86}[(AlO_2)_{86}(SiO_2)_{106}]\cdot 276H_2O$.

Molecular sieves are commercially available in powder, pellets or beads containing about 20 percent inert clay binder. The water of hydration is removed by heating before the product is ready for use.

Table 1 presents a listing of various halocarbons which can be purified using the present process.

TABLE 1

Refrigerant codes and Formulae for Halocarbons

| Refrigerant Code No. | Halocarbon Name | Molecular Formula |
| --- | --- | --- |
| — | perchloroethylene | $Cl_2C_2Cl_2$ |
| — | Chloroform | $CCHCl_3$ |
| 10 | Tetrachloromethane(carbon tetrachloride) | $CCl_4$ |
| 11 | Trichlorofluoromethane | $CCl_3F$ |
| 12 | Dichlorodifluoromethane | $CCl_2F_2$ |
| 12B1 | Bromochlorodifluoromethane | $CBrClF_2$ |
| 13 | Chlorotrifluoromethane | $CClF_3$ |
| 13B1 | Bromotrifluoromethane | $CBrF_3$ |
| 14 | Tetrafluoromethane | $CF_4$ |
| 20 | Trichloromethane | $CHCCl_3$ |
| 21 | Dichlorofluoromethane | $CHCl_2F$ |
| 22 | Chlorodifluoromethane | $CHClF_2$ |
| 23 | Trifluoromethane | $CHF_3$ |
| 30 | Dichloromethane | $CH_2Cl_2$ |
| 31 | Chlorofluoromethane | $CH_2ClF$ |
| 32 | Difluoromethane | $CH_2F_2$ |
| 40 | Chloromethane | $CH_3Cl$ |
| 41 | Fluoromethane | $CH_3F$ |
| 110 | Hexachloroethane | $C_2Cl_6$ |
| 111 | Pentachlorofluoroethane | $C_2Cl_5F$ |
| 112 | Tetrachloro-1,2-difluoroethane | $C_2Cl_4F_2$ |
| 112a | 1,1,1,2-Tetrachloro-2,2-difluoroethane | |
| 113 | 1,1,2-Trichlorotrifluoroethane | $C_2Cl_3F_3$ |
| 113a | 1,1,1-Trichlorotrifluoroethane | $C_2Cl_3F_3$ |
| 114 | 1,2-Dichlorotetrafluoroethane | $C_2Cl_2F_4$ |
| 114a | 1,1-Dichlorotetrafluoroethane | $C_2Cl_2F_4$ |
| 114b | 1,2-dibromotetrafluoroethane | $C_2Br_2F_4$ |
| 115 | Chloropentafluoroethane | $C_2ClF_5$ |
| 116 | Hexafluoroethane | $C_2F_6$ |
| 120 | Pentachloroethane | $C_2HCl_5$ |
| 121 | 1,1,2,2-Tetrachloro-1-fluoroethane | $C_2HCl_4F$ |
| 121a | 1,1,1,2-Tetrachloro-2-fluoroethane | $C_2HCl_4F$ |
| 122 | 1,2,2-Trichloro-1,1-difluoroethane | $C_2HCl_3F_2$ |
| 122a | 1,1,2-Trichloro-1,2-difluoroethane | $C_2HCl_3F_2$ |
| 122b | 1,1,1-Trichloro-2,2-difluoroethane | $C_2HCl_3F_2$ |
| 123 | 2,2-Dichloro-1,1,1-trifluoroethane | $C_2HCl_2F_3$ |
| 123a | 1,2-Dichloro-1,2,2-trifluoroethane | $C_2HCl_2F_3$ |
| 124 | 2-Chloro-1,1,1,2-tetrafluoroethane | $C_2HClF_4$ |
| 124a | 1-Chloro-1,1,2,2-tetrafluoroethane | $C_2HClF_4$ |
| 125 | Pentafluoroethane | $C_2HF_5$ |
| 130 | 1,1,2,2-Tetrachloroethane | $C_2H_2Cl_4$ |
| 131 | 1,1,2-Trichloro-2-fluoroethane | $C_2H_2Cl_3F$ |
| 132 | 1,2-Dichloro-1,2-difluoroethane | $C_2H_2Cl_2F_2$ |
| 132b | 1,2-Dichloro-1,1-difluoroethane | $C_2H_2Cl_2F_2$ |
| 133 | 1-Chloro-1,2,2-trifluoroethane | $C_2H_2ClF_3$ |
| 133a | 2-Chloro-1,1,1-trifluoroethane | $C_2H_2ClF_3$ |
| 133b | 1-Chloro-1,1,2-trifluoroethane | $C_2H_2ClF_3$ |
| 134 | 1,1,2,2-Tetrafluoroethane | $C_2H_2F_4$ |
| 134a | 1,1,1,2-Tetrafluoroethane | $C_2H_2F_4$ |
| 140 | 1,1,2-Trichloroethane | $C_2H_3Cl_3$ |
| 140a | 1,1,1-Trichloroethane | $C_2H_3Cl_3$ |
| 141 | 1,2-Dichloro-1-fluoroethane | $C_3H_3Cl_2F$ |
| 141b | 1,1-Dichloro-1-fluoroethane | $C_2H_3Cl_2F$ |
| 142 | 2-Chloro-1,1-difluoroethane | $C_2H_3ClF_2$ |
| 142b | 1-Chloro-1,1-difluoroethane | $C_2H_3ClF_2$ |
| 143 | 1,1,2-Trifluoroethane | $C_2H_3F_3$ |
| 143a | 1,1,1-Trifluoroethane | $C_2H_3F_3$ |
| 150 | 1,2-Dichloroethane | $C_2H_4Cl_2$ |
| 150a | 1,1-Dichloroethane | $C_2H_4Cl_2$ |
| 151 | 1-Chloro-2-fluoroethane | $C_2H_4ClF$ |
| 151a | 1-Chloro-1-fluoroethane | $C_2H_4ClF$ |
| 152 | 1,2-Difluoroethane | $C_2H_4F_2$ |
| 152a | 1,1-Difluoroethane | $C_2H_4F_2$ |
| 160 | Chloroethane | $C_2H_5Cl$ |
| 161 | Fluoroethane | $C_2H_5F$ |
| 218 | Perfluoropropane | $C_3F_3$ |
| 227 | Heptafluoropropane | $C_3HF_7$ |
| 1112a | 1,1-Dichloro-2,2-difluoroethylene | $C_2Cl_2F_2$ |
| 1113 | Chlorotrifluoroethylene | $C_2ClF_3$ |
| 1114 | Tetrafluoroethylene | $C_2F_4$ |
| 1120 | Trichloroethylene | $C_2HCl_3$ |
| 1130 | cis-1,2-Dichloroethylene | $C_2H_2Cl_2$ |
| 1130 | trans-1,2-Dichloroethylene | $C_2H_2Cl_2$ |
| 1132 | 1,1-Difluoroethylene | $C_2H_2F_2$ |
| 1140 | Chloroethylene | $C_2H_3Cl$ |
| 1141 | Fluoroethylene | $C_2H_3F$ |
| C316 | 1,2-Dichlorohexafluorocyclobutane | $C_4Cl_2F_6$ |
| C317 | Chloroheptafluorocyclobutane | $C_4ClF_7$ |
| C318 | Perfluorocyclobutane | $C_4F_8$ |

We claim:

1. A process for recovering a halocarbon from a liquid waste slurry containing the halocarbon admixed with one or more contaminants, comprising, providing a countercurrent extraction column having two or more agitators and means for moving said agitators, said column also having in the following vertical order from the column top to the column bottom: an immiscible liquid outlet, a waste slurry inlet, an immiscible liquid inlet and a raffinate outlet;

introducing or feeding optionally filtered or unfiltered liquid slurry into said waste slurry inlet;

introducing or feeding a liquid which is immiscible with the halocarbon component of the waste slurry into the immiscible liquid inlet;

allowing a continuous flow of liquid waste slurry to move countercurrently to a continuous flow of the immiscible liquid through said two or more agitators that promote dispersion of the liquid waste slurry and the immiscible liquid at each agitator, thus facilitating transfer of contaminants from the waste slurry to the immiscible liquid;

removing the immiscible liquid containing waste contaminants extracted from said optionally filtered or unfiltered liquid slurry, at said immiscible liquid outlet;

allowing the halocarbon to separate from the immiscible liquid and the contaminants; and recovering the halocarbon or raffinate at said raffinate outlet.

2. The process of claim 1, further comprising the step of:

passing said raffinate through a molecular sieve to remove residual immiscible liquid and/or contaminants.

3. A process for recovering a halocarbon from a liquid waste slurry containing the halocarbon admixed with one or more contaminants, comprising the steps of:

allowing a continuous flow of the liquid waste slurry to move either countercurrently or co-currently to a continuous; flow of a liquid which is immiscible with the halocarbon in the waste slurry through two or more agitators that promote dispersion of the liquid waste slurry and the immiscible liquid at each agitator, thus facilitating transfer of contaminants from the waste slurry to the immiscible liquid;

allowing the halocarbon to separate from the immisible liquid and the contaminants; and recovering the halocarbon or raffinate.

4. The process of claim 3, further comprising the step of separating out insoluble or suspended solids from the liquid waste slurry, prior to countercurrent or co-current flow of the liquid waste slurry and the immiscible liquid.

5. The process of claim 4 wherein the insoluble or suspended solids are separated out from the liquid waste slurry by filtration and/or centrifugation.

6. The process of claim 3, further comprising the step of passing said halocarbon or raffinate through a molecular sieve to remove residual immiscible liquid and/or contaminants.

7. The process of claim 3 wherein the flow of liquid waste slurry moves countercurrently to the flow of the immiscible liquid.

8. The process of claim 3 wherein the immiscible liquid is water.

9. The process of claim 3 wherein the immiscible liquid is water, acetone, C1–C6 alcohol or a mixture thereof.

10. The process of claim 3 wherein the halocarbon is a halogenated alkane of one to four carbon atoms.

11. The process of claim 3 wherein the halocarbon is a halogenated alkene of two to four carbon atoms.

12. The process of claim 3 wherein the halocarbon is trichlorofluoromethane (freon 11).

13. The process of claim 3 wherein the agitator is a disk, baffle, mesh or plate.

14. The process of claim 3 wherein the number of agitators range from about 6 to about 30.

15. The process of claim 3 wherein the halocarbon is a halogenated alkane of one to four carbon atoms and the immiscible liquid is water, acetone, C1–C6 alcohol or a mixture thereof.

16. The process of claim 3 wherein the halocarbon is trichlorofluoromethane (freon 11) and the immiscible liquid is water, acetone, C1–C6 alcohol or a mixture thereof.

17. The process of claim 3 wherein the halocarbon is trichlorofluoromethane (freon 11) and the immiscible liquid is water.

* * * * *